United States Patent
Jones et al.

(10) Patent No.: US 6,281,998 B1
(45) Date of Patent: Aug. 28, 2001

(54) SIGNAL ROUTING FOR FIBER OPTIC NETWORKS

(75) Inventors: Kevan Peter Jones, Devon; Simon James Kendrick, Kent, both of (GB)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/000,418

(22) PCT Filed: Aug. 2, 1996

(86) PCT No.: PCT/GB96/01890

§ 371 Date: Jun. 1, 1998

§ 102(e) Date: Jun. 1, 1998

(87) PCT Pub. No.: WO97/06617

PCT Pub. Date: Feb. 20, 1997

(30) Foreign Application Priority Data

Aug. 4, 1995 (GB) .................................................. 9516048
Dec. 21, 1995 (GB) .................................................. 9526219
Jan. 16, 1996 (GB) .................................................. 9600814

(51) Int. Cl.$^7$ .................................................. H04J 14/02
(52) U.S. Cl. ........................... 359/130; 359/127; 359/128
(58) Field of Search .................................. 359/127, 128, 359/130

(56) References Cited

U.S. PATENT DOCUMENTS

| | | | |
|---|---|---|---|
| 4,906,064 | * 3/1990 | Cheung | 350/96.15 |
| 5,615,290 | * 3/1997 | Harasawa et al. | 385/24 |
| 5,675,676 | * 10/1997 | Yamashita et al. | 385/24 |
| 5,838,477 | * 11/1998 | Yamamoto et al. | 359/179 |
| 6,002,820 | * 12/1999 | Nitta | 385/24 |
| 6,038,046 | * 3/2000 | Kaneko et al. | 359/130 |
| 6,061,157 | * 5/2000 | Terahara | 359/124 |

(List continued on next page.)

OTHER PUBLICATIONS

IEEE Infocom '93. The Conference on Computer Communications Proceedings. Twelfth Annual Joint Conference of the IEEE Computer and Communications Societies. Networking: Foundation for the Future.
(Cat. No. 93CH3264–9), San Francisco, CA, USA, Mar. 28–, ISBN 0–8186–3580–0, 1993, Los Altimos, CA, USA, IEEE Comnput. Soc. Press, USA, pp. 578–585 vol. 2, XP000399037.
Lee K –C et al: "Routing and switching in a wavelength convertible optical network" see p. 578, right–hand column, line 13—line 25.

(List continued on next page.)

*Primary Examiner*—Leslie Pascal
*Assistant Examiner*—Hanh Phan
(74) *Attorney, Agent, or Firm*—Ware, Fressola, Van der Sluys & Adolphson LLP

(57) ABSTRACT

A branching unit for a fiber optic network carrying signals on trunk fibers includes an add/drop multiplexer for passing signals and/or dropping and adding signals on spur fibers, and further includes switches providing a normal signal routing between designated inputs and designated outputs of the branching unit and further providing an alternative signal routing in which no signals are routed to one or more designated outputs of the branching unit. Those signals normally routed to said one or more designated outputs are routed to one or more other outputs of the branching unit. Thus, the branching unit can be reconfigured by operation of the switches, which is especially desirable if one of trunk or spur fibers is damaged. The switches may include Bragg gratings and may be 2×2 optical switches, 4×4 optical switches or other optical switches in various configurations. Various alternate routings of signals are shown.

31 Claims, 10 Drawing Sheets

U.S. PATENT DOCUMENTS

| | | | | |
|---|---|---|---|---|
| 6,061,484 | * | 5/2000 | Jones et al. | 385/24 |
| 6,108,468 | * | 8/2000 | Kaneko et al. | 385/24 |
| 6,115,158 | * | 9/2000 | Kaneko | 359/129 |

OTHER PUBLICATIONS

International Conference on Integrated Broadband Services and Networks (Conf. Publ. No. 329), London, UK, Oct. 15–18, 1990, 1990, London, UK, IEE, UK, pp. 63–67, XP000410579.

Hill G R et al: "Applications of wavelength routing in a core telecommunication network".

IEE Proceedings J (Optoelectronics), Oct. 1993, UK, vol. 140, No. 5 ISSN 0267–3932, pp. 309–315, XP000412793.

Gillner L: "Properties of optical switching networks with passive or active space switches".

"Low–Loss ADD/DROP Multiplexers for WDM Lightwave Networks" C. R. Giles & V. Mizrahi, IOOC 95.

* cited by examiner

SIGNAL ROUTING FOR FIBER OPTIC NETWORKS

FIELD OF THE INVENTION

The present invention relates to apparatus and methods for signal routing within fiber optic networks, and particularly to use of switching within a branching unit of a fiber optic network. Such switching is particularly adapted to use either within, or to determine routing of signals to, an add/drop multiplexer. The invention extends in further aspects to an add/drop multiplexer comprising switching means, and to a branching unit for a fiber optic network comprising switching means, or comprising an add/drop multiplexer associated with switching means as indicated above. The invention also relates to switchable wavelength routing elements.

BACKGROUND OF THE INVENTION

As is discussed in the applicant's copending International Patent Application, filed on the same date as the present application and entitled "Add/drop Multiplexer", the content of which is incorporated herein by reference, it is possible to construct a branching element for a fiber optic component which is essentially passive. An schematic example is shown in FIG. 1A, comprising a branching element 105 having a first branch 101 for carrying signals to and from a first part of a fiber trunk, a second branch 102 for carrying signals to and from a second part of the fiber trunk, and a third branch 103 for carrying signals to and from a spur station. Although each of the "branches" 101,102,103 is shown here as a single fiber, this is only for ease of illustration: it is possible for each of branches 101, 102, 103 to comprise a plurality of fibers. Branches 101, 102 generally will comprise two or more fibers, one or more to carry traffic in one direction and one or more to carry traffic in the opposite direction. Signals at specific carrier wavelengths are routed by the system so that they are directed out of the branching element according to their carrier wavelength. In an exemplary case, signals arriving on branch 101 are allowed to pass out to branch 102, except at carrier wavelength $\lambda_1$, when they are diverted to branch fiber 103. New signals $\lambda_1'$ at the same carrier wavelength are added to the branching element from the spur station along branch 103 and are passed out of the branching element along branch 102. Similarly, signals entering the branching element along branch 102 pass out on to branch 101, except at a different carrier wavelength $\lambda_2$, at which signals are dropped to the spur station along branch 103, and replaced with other signals $\lambda_2'$ at this wavelength entering the branching element along branch 103 and passing out along branch 102.

A passive branching element such as indicated above can be designed to have considerable advantages: it can employ relatively few components and can be constructed so that it should not require attention at any point during its working life. Such an element is particularly suitable to use in undersea cable networks. However, it would be desirable even in this area to be able to switch a branching element to at least a limited degree. One desirable option is shown in FIG. 1B: as well as dropping $\lambda_1$ from trunk 101 to spur 103, $\lambda_3$ is dropped and replaced with a new signal from spur 103 at the same carrier wavelength. Alternatively, $\lambda_3$ could be dropped instead of $\lambda_1$. Ability to provide such features may allow the network as a whole to be reconfigured (for example, by the addition or removal of spur stations to or from the network, or by the addition of capacity to the spur node) without any need physically to change or replace individual branching units already in place.

Further desirable options are shown in FIGS. 1C, 1D and 1E. These all relate to a break in either the trunk or the spur. All these options are of assistance in allowing traffic to still be transmitted even after such a break has occurred by routing all traffic away from the broken branch. In the FIG. 1C case of a broken spur fiber 103, all traffic to the spur is routed on to one or the other of the trunk branches 101, 102. It then passes through a preceding or a subsequent alternative branching unit and spur station (the alternative branching unit being modified, for example, by being adapted to add and drop additional carrier wavelengths by switching from a FIG. 1A configuration to a FIG. 1B configuration) and then transmitted between the fiber break spur station and the alternative spur station by means of a back-haul network (e.g. a land line) between the two stations. Traffic from the spur can follow the same route, but in the opposite direction. FIGS. 1D and 1E show arrangements which allow the rerouting of all traffic in response to a break in the trunk fiber. All signals for transmission to the broken trunk 102 in FIG. 1D are dropped down spur 103 and communicated through a back-haul network to another spur for a branching unit as shown in FIG. 1E, so that all signals to travel along the trunk fiber are routed around the fiber break.

In C. R. Giles and V. Mizrahi, IOOC-95, ThC2-1, pp 66–67, an experimental arrangement is shown including a simple add/drop multiplexer in which the add/drop wavelength can be changed. An add/drop multiplexer of this general type is shown in FIG. 15. The signal path, which links a first optical circulator 901 at which a signal may be dropped and a second optical circulator 902 at which a signal may be added, goes into a first 1×2 optical switch 903 and out from a second 1×2 optical switch 904. The two optical switches are linked by a first path with a Bragg grating 905 to reflect light at $\lambda_1$ and also by a second path with a Bragg grating 906 to reflect light at $\lambda_2$, with the result that the add/drop wavelength of the multiplexer can be switched between $\lambda_1$ and $\lambda_2$: the connection to ports of the circulators is such that only signals of the carrier wavelengths reflected by the Bragg grating on the chosen signal path will be added or dropped. This document does not however provide or suggest a full solution to the problem of constructing rerouting mechanisms for use in branching units of a fiber optic network to achieve the functionality of FIGS. 1B to 1E.

There is thus a need to provide simple and economical switching mechanisms to achieve signal rerouting with the functionalities indicated in FIGS. 1B to 1E. Generally, there is a need to provide simple and reliable switching for branching units of a fiber optic network.

Accordingly, the invention provides a branching unit for a fiber optic network adapted to carry signals at a plurality of predetermined carrier wavelengths, comprising one or more inputs for receiving signals either from one or more trunk fibers of the network or from spur fibers for adding signals from spur stations of the network, one or more outputs for outputting signals either to one or more trunk fibers of the network or to spur fibers for dropping signals to spur stations of the network, and an add/drop multiplexer and switching means to provide two or more different routings of signals between said inputs and said outputs.

In one advantageous form, said switching means is adapted to provide alternative signal routings such that signals at one or more predetermined carrier wavelengths entering the branching unit at one input are directed in said alternative signal routings to alternative outputs of the branching unit. In another advantageous form, said switching means is adapted to provide a normal signal routing and an alternative signal routing, such that in said alternative signal routing, signals are rerouted from one or more designated outputs of the branching unit to one or more other outputs of the branching unit.

In certain preferred embodiments, said switching means comprises one or more switching elements having a first state in which signals pass directly therethrough and a second state in which signals are diverted around a loop path with one or more wavelength routing components thereon. At least one of said switching elements may be provided within said add/drop multiplexer: for at least one of said switching elements the add/drop multiplexer may be provided within the loop path.

Advantageously, the switching means comprises a prerouting switch network connected between inputs and outputs of said add/drop multiplexer and said inputs and outputs of the branching unit to enable rerouting of signals away from one or more of the branching unit outputs. Preferably, said signals rerouted away from the one or more of the branching unit outputs do not pass through the add/drop multiplexer. It is preferred that said prerouting switch network comprises a plurality of 2×2 optical switches, especially fused fiber switches comprising a fiber optic coupler in which the switching is accomplished by bending of the coupler fibers.

The invention further provides a branching unit for a fiber optic network adapted to carry signals at a plurality of predetermined carrier wavelengths, comprising one or more inputs for receiving signals from fibers of the network, one or more outputs for outputting signals to fibers of the network, and an add/drop multiplexer to route signals between said one or more inputs and said one or more outputs and switching means comprising one or more 2×2 optical switches to provide at least one alternative routing of signals between said one or more inputs and said one or more outputs.

In a further aspect, the invention provides a wavelength routing element for wavelength division multiplexing in a fiber optic network, comprising a linear array of switching segments defining a signal line between an input and an output of the wavelength routing element, and further comprising an input for a control signal, wherein each switching segment comprises: means for rerouting signals at one or more predetermined carrier wavelengths, and means for switching said signal rerouting means in or out of the signal line in response to a component of the control signal relating to said switching segment, such that signals at a chosen set of predetermined carrier wavelengths are reroutable according to the components of the control signal. Advantageously, there are N switching segments in said linear array, and for the Nth switching segment the signal rerouting means comprises a fiber Bragg grating for a carrier wavelength $\lambda_N$, so that components of the control signal are selectable to allow any carrier wavelength $\lambda_N$ to be reflected or transmitted by the wavelength routing element. In this aspect, the invention further provides a multi-wavelength filter, and also an add/drop multiplexer, comprising such a wavelength routing element.

In a still further aspect, the invention provides a wavelength routing element for wavelength division multiplexing in a fiber optic network, comprising an input, an output and an input/output, means for selective routing of signals at predetermined wavelengths either from the input to the output or between the input/output and the input or output, and switching means for the selective signal routing means to switch the signal routing provided thereby, wherein the signal routing means is adapted such that a path for signals for routing from the input to the output irrespective of the state of the switching means is not even temporarily affected by any activation of the switching means.

Wavelength routing elements as described above may be used in add/drop multiplexers, and such add/drop multiplexers may be particularly adapted for use in branching units as indicated above.

In a further aspect, the invention provides a wavelength routing element, comprising an input, an output, and a switching element having a first state in which signals pass directly therethrough from the input to the output and a second state in which signals are diverted around a loop path with one or more wavelength routing components thereon.

The invention further provides a method of routing signals at a plurality of predetermined carrier wavelengths between stations of a fiber optic network, comprising directing said signals into branching units comprising both one or more passive add/drop multiplexers which provide a predetermined routing of signals according to carrier wavelength, and a switching network, and by operating the switching network so as to change the routing of signals within said branching units for one or more predetermined carrier wavelengths.

Such a method may be particularly adapted such that a signal path is provided within said branching units for signals for onward transmission along the fiber optic network which is not even temporarily affected by activation of any of the switching elements within one of said add/drop multiplexers.

Specific embodiments of the invention are described below, by way of example, particularly with reference to the accompanying drawings, of which:

DETAILED DESCRIPTION OF THE INVENTION

Figure 2A:
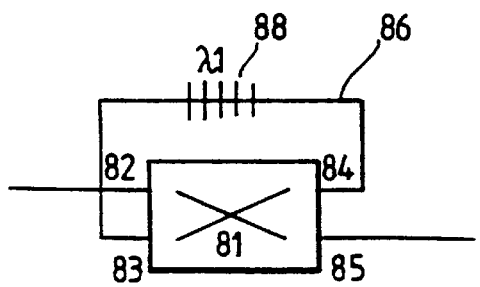
FIGS. 2A and 2B show embodiments of switching elements for branching units according to embodiments of the invention.
Figure 2B:
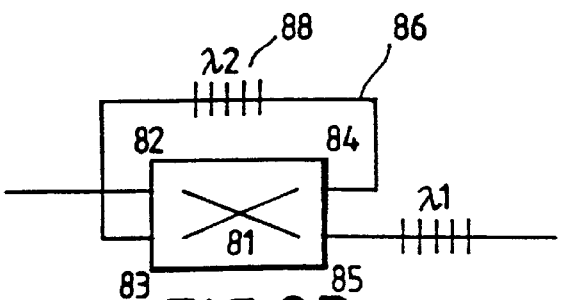

FIGS. 2A and 2B show embodiments of switching elements for branching units according to embodiments of the invention. Central to both embodiments is a 2×2 optical cross point switch 81. The switch 81 has two states, one in which signals pass straight through between corresponding points (82 with 84, and 83 with 85), and a second in which signals pass between crossed points (82 with 85, and 83 with 84). The switching elements as a whole are configured to have a first state in which signals pass directly therethrough, and a second state in which signals are diverted around a loop 86 with one or more optical elements 88 thereon. In FIG. 2A, when 2×2 switch 81 is set crossed, a signal will pass straight through between points 82 and 85, but when 2×2 switch 81 is set uncrossed, signals will be diverted around loop 86. The result is that in the crossed state, this switching element will allow all signals straight through, but in the uncrossed, or "straight through" state, signals at the carrier wavelength $\lambda_1$ will be reflected back by optical component 88, in this case a notch reflection filter (preferably a fiber Bragg grating) at $\lambda_1$. The switching element is symmetrical, so this behaviour applies both to signals entering at point 82 and at point 85. Similarly, the switching element in the FIG. 2B embodiment will in the crossed state reflect signals at $\lambda_1$ only. In the straight through state, signals will be diverted around loop 86 and signals at carrier wavelength $X_2$ will also be reflected by fiber Bragg grating 88. Signals to activate the switches may be provided by electrical control signals or any other appropriate conventional means.

A particularly advantageous form of 2×2 switch is a mechanically actuated fused fiber switch, such as those produced by OptiVideo Corporation of Boulder, Colo., USA. These switches are optomechanical devices. They comprise a fiber optic coupler consisting of a pair of fibers fused together (such fused pairs are manufactured by Corning Inc.). Two inputs and outputs are provided, one of each on each fiber. In an unstressed state, signals pass directly along between each fiber between the respective input and output and do not pass between fibers. However, when mechanical force is applied to the coupler to provide a precisely determined degree of bending (this can be achieved with an electromechanical actuator), the characteristic of the coupler changes, and signals will pass substantially entirely from the input on one fiber to the output on the other fiber. Such a switch does not require making/breaking the fiber paths—there is no point where no optical path exists through the switch because fibers forming part of the path are not in contact with each other, as in conventional make/break switches. Such a switch is particularly appropriate in the context of the present invention, as it offers low loss and high repeatability.

Figure 3:
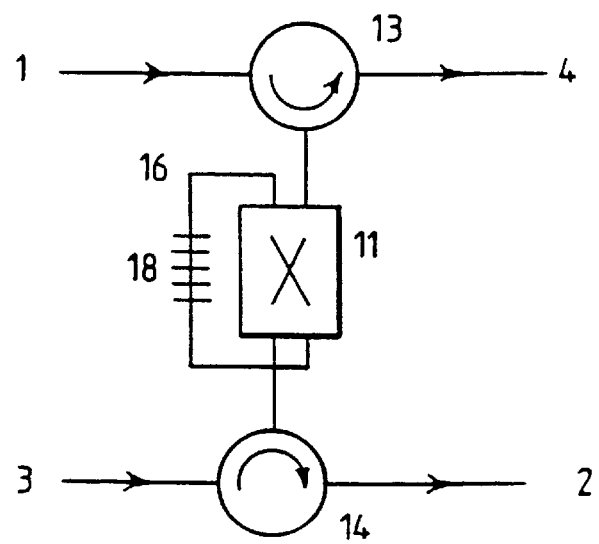
FIG. 3 shows an add/drop multiplexer for use in a branching unit according to an embodiment of the invention.

Such switching elements can be used in a branching unit for a fiber optic network adapted to carry signals at a plurality of predetermined carrier wavelengths, as is shown in FIG. 3. The branching unit comprises an input 1 for receiving signals from a trunk fiber, an output 2 for outputting signals to a trunk fiber, an input 3 for receiving signals from a spur fiber (add fiber) connected to a spur station of the network, and an output 4 for outputting signals to a spur fiber 4 (drop fiber). Between and connecting these inputs and outputs is an add/drop multiplexer, in this case an essentially passive add/drop multiplexer comprising three-port optical circulators 13, 14 and a fiber connection between them. Each optical circulator circulates substantially all of a signal received at one port out through the next port in sequence (as shown by the arrow). A switching means is provided, in this case consisting of a switching element within the add/drop multiplexer (situated on the fiber connection), to provide two different routings of signals between said inputs and said outputs. The switching element is essentially as that shown in FIG. 2A, and comprises a 2×2 switch 11 and a loop 16 with a fiber Bragg grating 18 thereon. In this case, if switch 11 is in the uncrossed state, signals will pass directly between trunk input 1 and trunk output 2, and between spur input 3 and spur output 4, except at the carrier wavelengths reflected by fiber Bragg grating (or gratings) 18: as can be seen by tracking signals through optical circulators 13 and 14, signals at these carrier wavelengths pass from trunk input 1 to spur output 4 and from spur input 3 to trunk output 2 respectively. However, if switch 11 is switched to the crossed position, loop 16 is taken out of circuit, and all signals pass directly from trunk input 1 to trunk output 2 and from spur input 3 to spur output 4. It should be noted that this arrangement does not allow light to circulate in the reverse direction if conventional three port circulators are employed (in which light entering at the third port is absorbed and not circulated to the first port of the circulator).

Figure 1A:
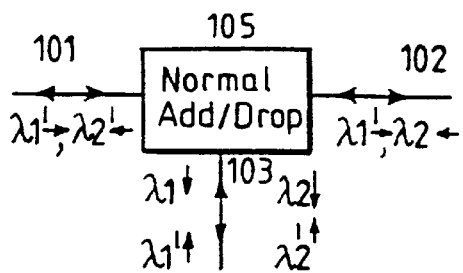
FIGS. 1A to 1E show a desirable range of routing configurations for an exemplary branching unit of a fiber optic network.
Figure 1B:
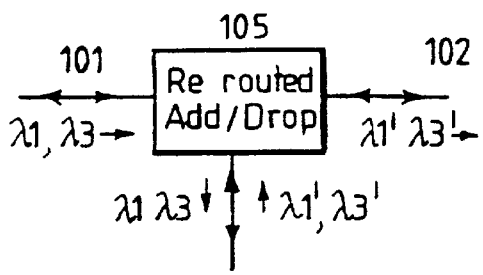
Figure 1C:
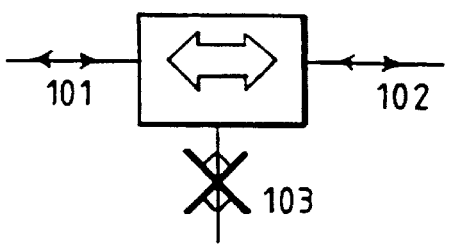

The arrangement of FIG. 3 is thus appropriate to the functionality illustrated in FIG. 1C, of particular assistance if the fiber connection to the spur station is broken. In such a circumstance, it is advantageous to route signals away from a designated output of the branching unit (in this case the spur output) where such signals would otherwise be lost through a fiber break. Other branching units of the network can then be reconfigured so that the signals for the relevant spur stations are dropped from the trunk elsewhere and routed back to their intended destination by a back-haul network, for example. However, by using instead of a FIG. 2A switching element a FIG. 2B switching element, a branching unit could be provided that was switchable so as to route one set of wavelengths between branch and spur when the loop was out of circuit, and an additional set of wavelengths between branch and spur when the loop was in circuit—such an arrangement would be of the type illustrated in FIG. 1B, and would be of benefit when it was desired to increase the signal capacity of the spur.

Figure 1D:
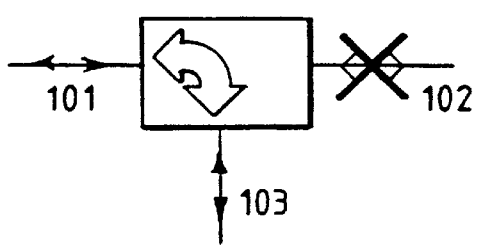
Figure 1E:
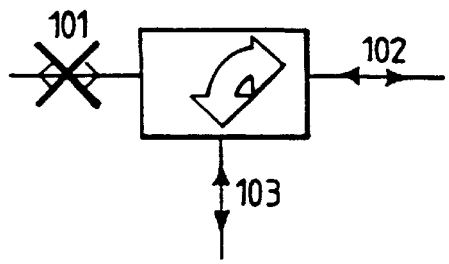

It is of course desirable also to provide the functionality of FIGS. 1D and 1E, so that breaks in the trunk fibers can be allowed for by directing signals away from designated outputs which are outputs to trunk fibers in a common section of trunk fiber cable. Such an arrangement is shown in FIG. 4.

Figure 4:
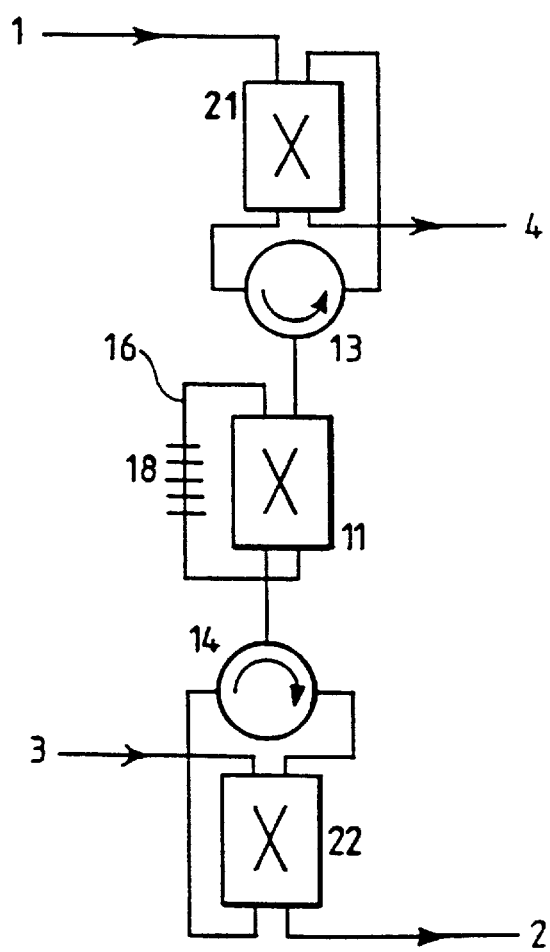
FIG. 4 shows an add/drop multiplexer for use in a branching unit according to an embodiment of the invention.

The FIG. 4 arrangement is essentially similar to that of FIG. 3, but a further switching element 21 has been arranged for interposition between trunk input 1, spur output 4, and optical circulator 13. Similarly, a still farther switching element 22 has been arranged for interposition between spur input 3, trunk output 2, and optical circulator 14. Switching elements 21 and 22 are of essentially the same construction as that shown in FIG. 2A, and the arrangement is in each case such that the add/drop multiplexer is effectively in the loop. If both switching elements 21 and 22 are in the uncrossed position, the routing achieved by the FIG. 4 branching unit will be exactly that achieved by the FIG. 3 branching unit. However, if either switching element is crossed, the routing is changed fundamentally. For example, if switching element 21 is crossed, signals from trunk input 1 pass directly to spur output 4: this arrangement is appropriate if the branch output side is broken (FIG. 1D case). Likewise, if switching element 22 is crossed, all signals from spur input 3 pass directly out to branch output 2, which will be appropriate if the branch input side is broken (FIG. 1E case). In both these cases, modifications will of course be required at other points in the network to enable the signals to be routed through alternate paths to the intended destination. More than one of the FIG. 4, or the FIG. 3, arrangements can be combined together in a multiple branching unit for the case of a network with a plurality of trunk or spur fibers.

An alternative way of achieving an active functionality, and more particularly of providing a branching unit with active functionality based upon a passive add/drop multiplexer, is by providing a prerouting switch network connected between inputs and outputs of the branching unit to enable rerouting of signals away from one or more of the branching unit outputs. An embodiment of the invention employing this approach is described below with reference to FIGS. 5A and 5B.

Figure 5A:
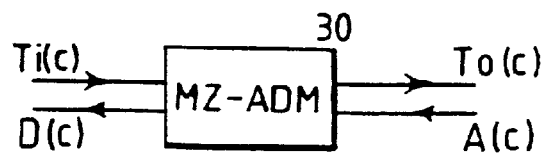
FIGS. 5A and 5B show an add/drop multiplexer and a prerouting switching network for use in a branching unit according to a further embodiment of the invention.

FIG. 5A shows a passive add/drop multiplexer with a particularly useful functionality. An add/drop multiplexer with this functionality can be constructed from a Mach-Zehnder interferometer comprising two matched 50:50 fiber optic couplers, linked by two matched paths having one or more fiber Bragg gratings thereon—such a Mach-Zehnder interferometer is discussed in Johnson et al, Electronics Letters, Vol. 23, pp 668–9, 1987, and add/drop multiplexers using such interferometers are discussed in the applicant's copending International Patent Application entitled "Add/drop Multiplexer" and referred to above. The add/drop multiplexer 30 (add/drop multiplexers of this type are termed below as MZ-ADMs, for Mach-Zehnder Add/Drop Multiplexer) has a first input and a first output (here labelled $T_i$ for trunk input and $T_o$ for trunk output respectively) and a second input and a second output (here labelled A for spur fiber add and D for spur fiber drop respectively). (c) indicates that these designations apply to the MZ-ADM component, for reasons indicated below. For a first set of carrier wavelengths (those passing straight along the trunk), signals are routed from first input to first output and from second input to second output. However, for a second set of carrier wavelengths (those to be dropped to and added from the spur), signals are routed from the first input to second output and from second input to first output.

Figure 5B:
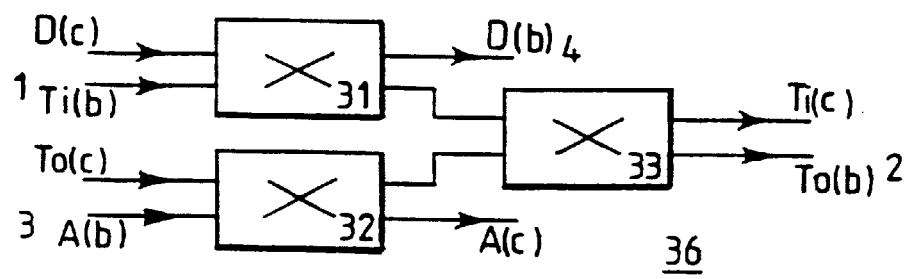

The MZ-ADM 30 shown in FIG. 5A is thus fundamental to the branching unit of this embodiment. The other critical aspect is the prerouting switch network 36, illustrated in FIG. 5B. This comprises here three 2×2 switches 31,32,33 of the type discussed above, though it will be appreciated that the man skilled in the art could achieve the same functionality through other switch arrangements, for example an appropriate combination of 1×2 switches. In FIG. 5B, the same convention is used to label the connection of signals as is shown in FIG. 5A: there is however a difference in that certain points are additionally labelled (b) rather than (c). Points labelled (b) are connected to the inputs or outputs 1,2,3.4 of the branching unit itself: for example, $T_i(b)$ is connected directly to the trunk fiber input 1. Points labelled (c) are as before connected to the appropriate port of MZ-ADM 30: for example, $T_i(c)$ emerging from switching element 33 in FIG. 5B is the same position as $T_i(c)$ in FIG. 5A, and shows that this port of switching element 33 is connected directly to the relevant port of MZ-ADM 30.

The resulting active functionality of the branching unit resulting is illustrated in Table 1 below. Route options are indicated with regard to the relevant one of FIGS. 1A to 1E, and the position of each switch is indicated by S (straight through), C (crossed), or—(undetermined—not relevant to routing).

TABLE 1

| Route Option | Routing | 31 | 32 | 33 |
| --- | --- | --- | --- | --- |
| FIG. 1A | Normal add/drop | S | S | S |
| FIG. 1C | Ti→To | S | S | C |
| FIG. 1D | Ti→D | C | — | — |
| FIG. 1E | A→To | — | C | S |

As can be seen, if all switches are in the straight through state a "normal" routing is achieved, and all signals pass directly between the relevant branching unit input (or output) and the relevant MZ-ADM input (or output). Crossing of switch 31 causes the trunk input signal to be dropped directly into the spur drop fiber without even passing through the MZ-ADM, thus achieving the FIG. 1D functionality. In similar fashion, appropriate switching of switches 31, 32 and 33 can provide the routings of FIGS. 1C and 1E without any signals passing through the MZ-ADM 30.

As is indicated above, this active functionality can be achieved with a different switching arrangement (for example, six 1×2 switches), but the 2×2 arrangement shown is particularly advantageous as it requires only a small number of relatively cheap and simple components.

Figure 6A:
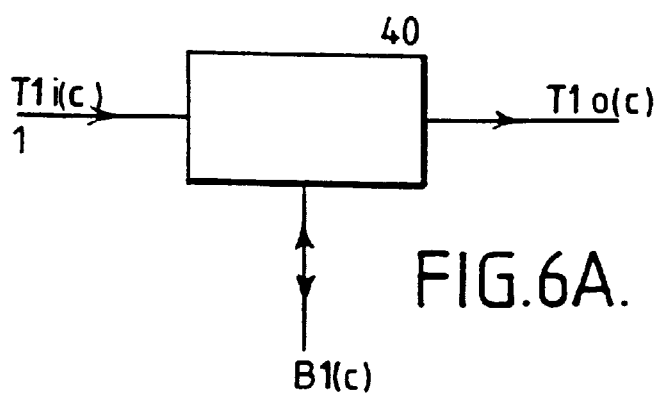
FIGS. 6A, 6B and 6C show an add/drop multiplexer and a prerouting switching network for use in a branching unit according to a yet further embodiment of the invention.

A further form of passive add/drop multiplexer which forms the basis of another embodiment of the invention is shown in FIG. 6A. Such add/drop multiplexers may be provided by, for example, appropriate combinations of optical circulators and fiber Bragg gratings. Such an arrangement, further described in the applicant's copending International Patent Application entitled "Add/drop Multiplexer" and referred to above: one example employing a five port optical circulator is shown in FIG. 6C. This add/drop multiplexer has a first input and a first output (here labelled $T1_i$ for first trunk input and $T1_o$ for second trunk output respectively—two of these add/drop multiplexers are required for use with a pair of trunk fibers carrying signals in opposite directions) and also an input/output spur corresponding respectively to an input 1, an output 2, and an input/output 5 of a branching unit. Such a design is appropriate for use with unrepeatered spur cables. In similar fashion to the MZ-ADM, for a first set of carrier wavelengths signals from the first input are routed to the first output, and for a second set of carrier wavelengths signals from the first input are routed to the input/output spur and signals from the input/output spur are routed to the first output.

Figure 6B:
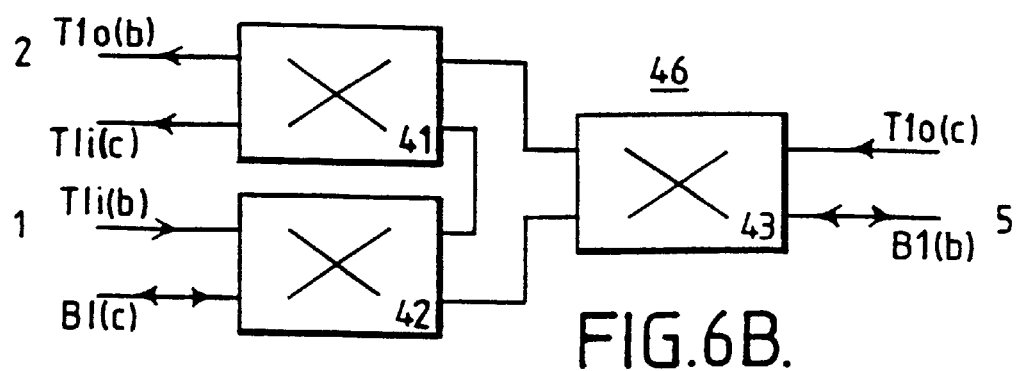
Figure 6C:
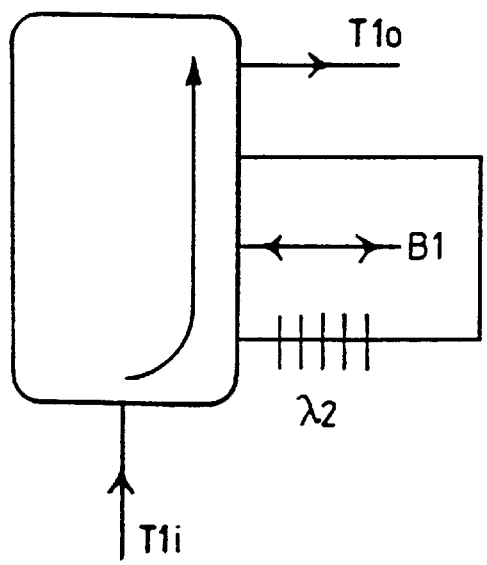

The appropriate prerouting network 46 to achieve the functionalities of FIGS. 1A, 1C, 1D and 1E for such an add/drop multiplexer 40 are shown in FIG. 6B, in which the same naming convention is used as is used with respect to FIG. 5B. The switch configurations necessary to provide all these functionalities are shown in Table 2 below.

TABLE 2

| Route Option | Routing | 41 | 42 | 43 |
|---|---|---|---|---|
| FIG. 1A | Normal add/drop | S | S | S |
| FIG. 1C | Tli→Tlo | C | S | — |
| FIG. 1D | Tli→B1 (drop) | — | C | S |
| FIG. 1E | B1 (add)→Tlo | — | S | C |

S, C and—have the same meaning in Table 2 as they did in Table 1. Again, it can be seen that the functionalities of FIGS. 1C to 1E can be achieved without the passage of any of the signals into the add/drop multiplexer 40. Using this arrangement, only six 2×2 switches are required for a branching unit for a trunk fiber pair—if 1×2 switches were used, twelve switches would be required.

Figure 7D:
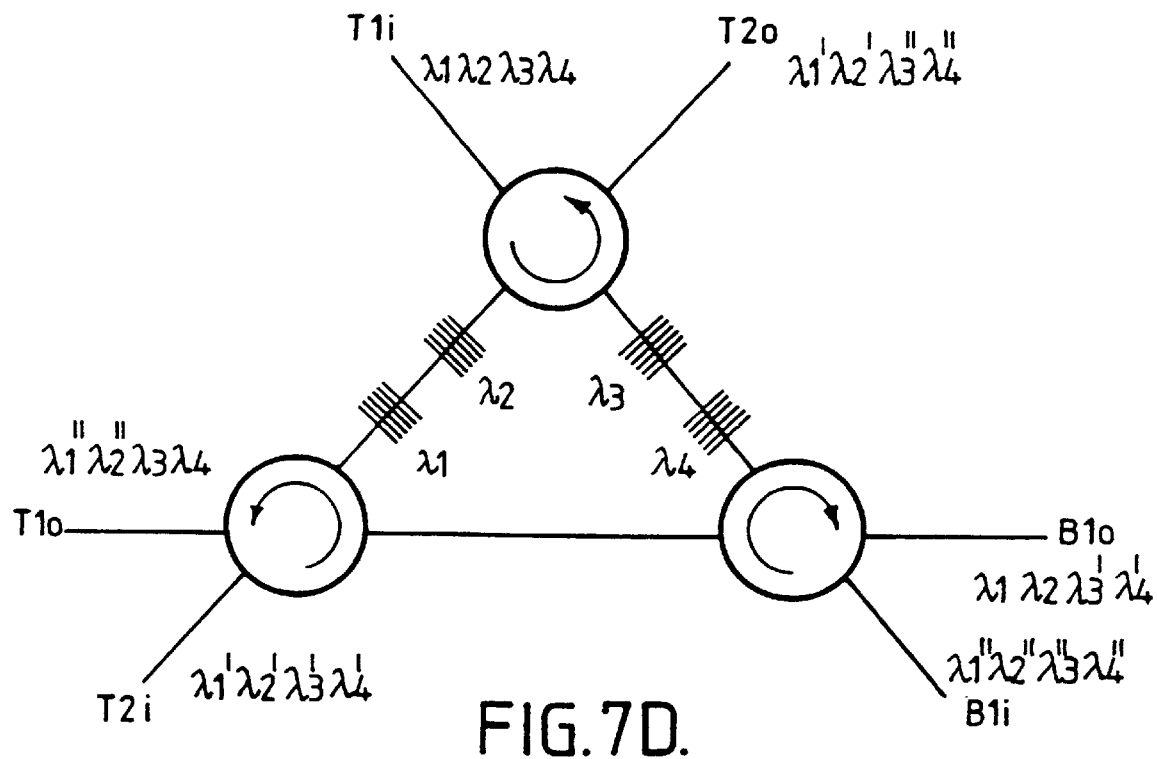
FIGS. 7A, 7B, 7C and 7D show an add/drop multiplexer and alternative prerouting switching networks for use in a branching unit according to a still further embodiment of the invention.
Figure 7A:
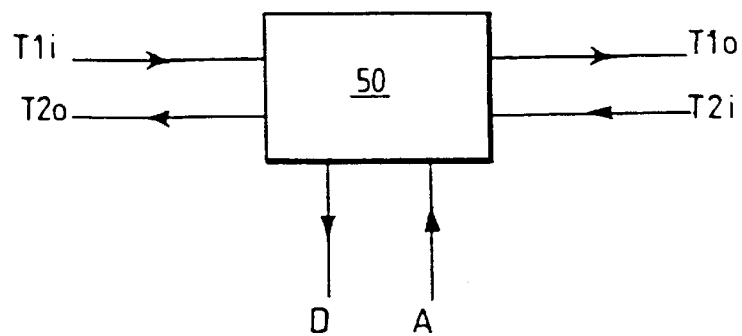

A passive add/drop multiplexer 50 which is in itself adapted for use with a trunk fiber pair and add and drop fibers to a spur station is depicted in FIG. 7A. Such add/drop multiplexers are discussed, for example, in the applicant's copending International Patent Application entitled "Add/drop Multiplexer" referred to above, and an example is shown in FIG. 7D. There are two trunk fiber inputs (T1$_i$ and T2$_i$) and two trunk outputs (T1$_o$ and T2$_o$), there being for each trunk fiber an input/output pair comprising an input and an output (e.g., T1$_i$ and T1$_o$). There is also provided a spur input A and a spur output D. The signals are routed according to carrier wavelength—signals arriving at a trunk fiber input are routed either to the trunk fiber output of that input/output pair or else to the spur output D, and signals arriving from spur input A are routed to an appropriate one of the trunk fiber outputs. This design may readily be expanded by addition of further trunk fibers (with consequent addition of a trunk fiber input and a trunk fiber output in an input/output pair for each additional trunk fiber).

Figure 7B:
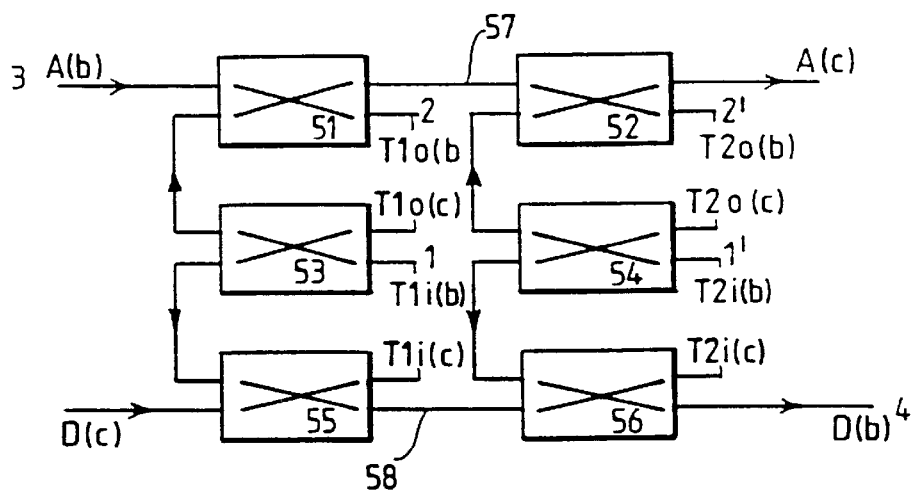

A prerouting network for a branching unit employing add/drop multiplexer 50 in accordance with an embodiment of the invention is depicted in FIG. 7B. The same labelling convention as used in previous FIGS. is adopted to indicate the connections between the prerouting switch network and the inputs 1,1' (trunk) 3 (spur) and outputs 2,2' (trunk) 4 (spur) of the branching unit itself and of the add/drop multiplexer 50 respectively. In the network of FIG. 7B, six 2×2 switches 51–56 are employed. As previously, the switch configurations required to give the functionalities of the appropriate Figures of FIGS. 1A to 1E are shown in a table, here Table 3 below.

TABLE 3

| Route Option | Routing | 51 | 52 | 53 | 54 | 55 | 56 |
|---|---|---|---|---|---|---|---|
| 1 | Normal add/drop | S | S | S | S | S | S |
| 3 | T1i→T1o<br>T2i→T2o | S | S | C | C | — | — |
| 4 | T1i→D<br>A→T2o | S | C | S | — | C | S |
| 5 | T2i→D<br>A→T1o | C | — | — | S | — | C |

Again, normal add/drop is achieved with all switches in the straight through position. Appropriate switching allows each of the FIG. 1C to FIG. 1E routings to be achieved. It is to be noted that the arrangement shown in FIG. 7B can readily be scaled to a greater number of trunk fibers. A column of three switches (51, 53, 55; 52, 54, 56) is provided for each input/output pair: linking each column is a spur input line 57, passing here through switches 51 and 52, and a spur output line 58, passing through switches 55 and 56 in this case. The column comprising switches 51, 53 and 55 is, in itself, identical in function to. the column comprising switches 52, 54 and 56, and it can readily be seen that the arrangement can be expanded to Pier trunk fibers by adding further columns as appropriate.

Figure 7C:
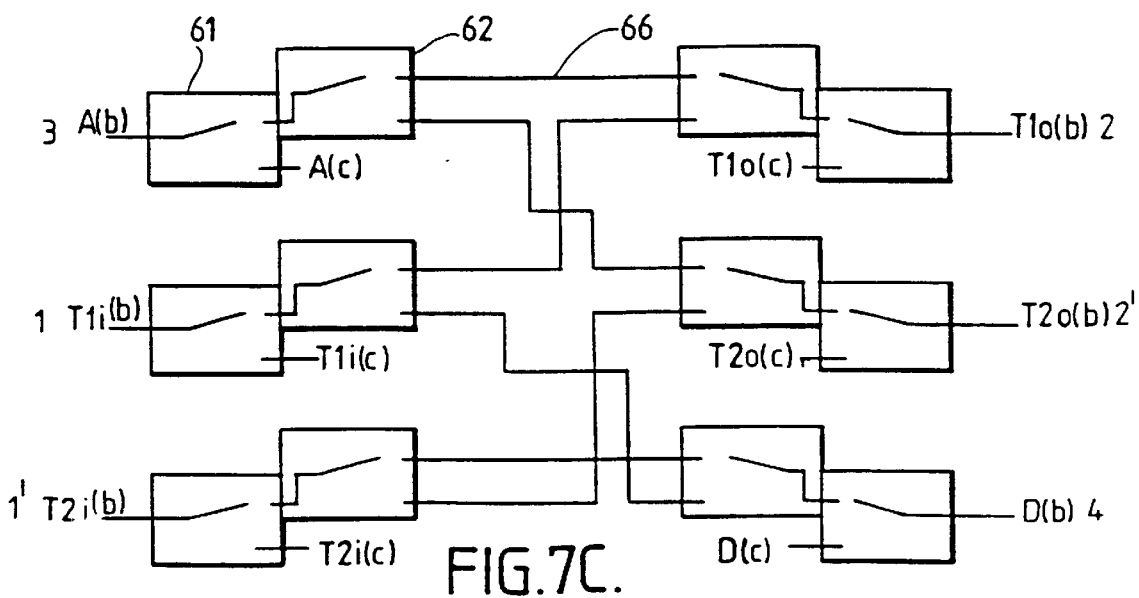

An alternative prerouting network with the same functionality as that shown in FIG. 7B is shown in FIG. 7C. The labelling convention adopted in FIG. 7C is the same adopted as that in FIG. 7B and other earlier Figures. The FIG. 7C prerouting network 66 employs twelve 1×2 switches, arrayed in pairs 61,62, each pair effectively functioning as a 1×3 switch. A table to illustrate the routing combinations is not provided, but it can be seen that appropriate switching combinations will provide all the routings shown in Table 3.

Figure 8A:
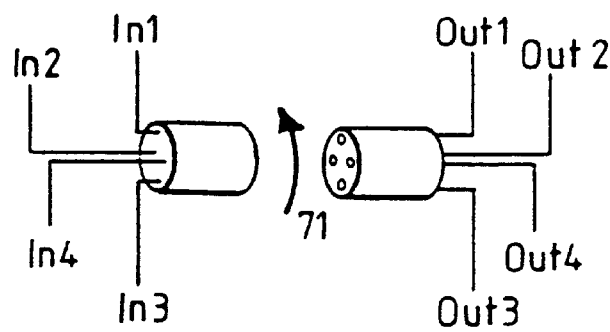
FIGS. 8A and 8B show a switch configuration and a prerouting switching network for use in a branching unit according to another embodiment of the invention.

While use of 1×2 switches generally requires twice as many switches to be used as when 2×2 switches are used, it is to be noted that use of higher order switches (e.g. nxn with n>2) can reduce the number of switches required still further. FIG. 8A illustrates a 4×4 switch. Such switches are available commercially from, for example JDS Fitel Inc., of Nepean, Ontario, Canada. There are four inputs (In1 to In4) and four outputs (Out1 to Out4), each set forming a cyclic sequence 1 to 4. Switch 71 is rotatable so that the inputs and outputs match with each other: any input can match with any output, but only such that all inputs and outputs are matched at any given time according to the cyclic sequence.

Figure 8B:
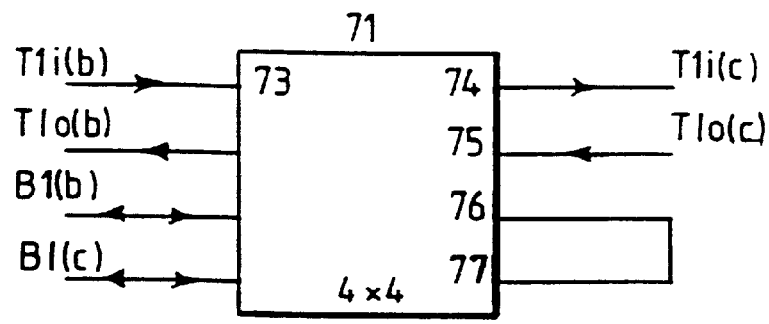

FIG. 8B shows a prerouting switch network for a further embodiment of a branching unit according to an embodiment of the invention for use with add/drop multiplexer 40 of FIG. 6A. The labelling convention shown is as before. No table is provided below, but it examination will indicate that bringing, in succession, the outputs 74, 75, 76 and 77 into communication with input 73 will lead to the FIG. 1A state, the FIG. 1E state, the FIG. 1C state and the FIG. 1D state.

Although use of higher order switches can lead to the use of fewer switches in total, the use of 2×2 switches as components is particularly advantageous and embodiments employing 2×2 switches are preferred. Several topologies are indicated in the aforementioned Figures which can be applied with, or around, passive wavelength division add/drop multiplexers to provide an active switched unit by the use of switch networks. In particular, 2×2 cross point fiber optic switches, advantageously provided in the form of fused fiber switches, can be used to provide all the functionalities indicated in and discussed above with reference to FIGS. 1A to 1E. Such switches can thus be used to provide in this way an all-fiber, low loss switching network in branching units according to the invention.

FIGS. 2A and 2B show simple switching elements, which allow a loop to be added to the signal circuit, the loop having one or more optical components as means for rerouting signals at predetermined carrier wavelengths—in the cases illustrated, these optical components- are fiber Bragg gratings 88. A simple, sophisticated and versatile alternative form of switching element, or wavelength routing element, in accordance with an embodiment of a further aspect of the invention, is shown in FIG. 9A.

Figure 9A:
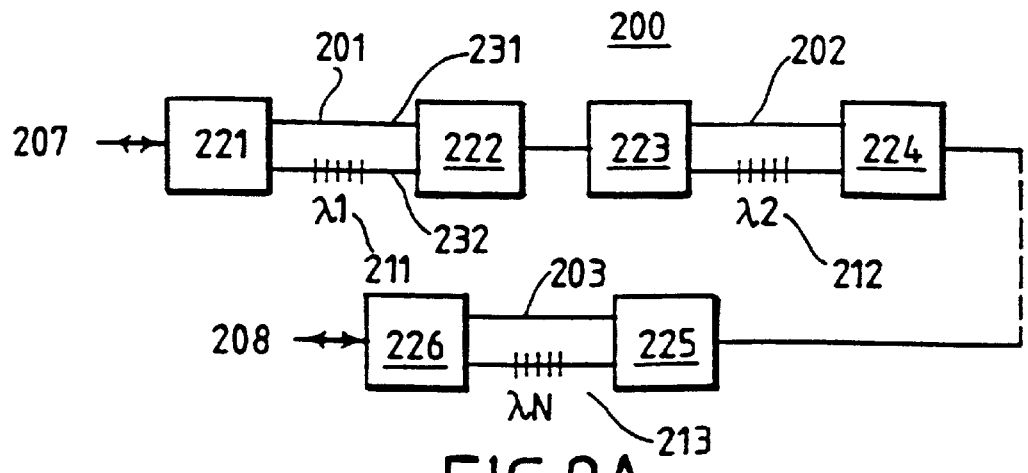
FIGS. 9A, 9B and 9C show wavelength routing means according to embodiments of a further aspect of the invention.

FIG. 9A shows a wavelength routing element for wavelength division multiplexing in a fiber optic network. It comprises a linear array 200 of switching segments 201, 202, 203. This linear array defines a signal line between an input 207 and an output 208 of the wavelength routing element. The wavelength routing element also has an input (not shown) for a control signal. Switching segment 201 comprises means for rerouting signals at one predetermined carrier wavelength. In this case, these means are fiber Bragg grating 211, which reflects signals at $\lambda_1$. This is on one of two paths 231, 232 between 1×2 optical switches 221 and 222. This switching segment also comprises, in the form of optical switches 221 and 222 and the paths 231 and 232 therebetween, means for switching the signal rerouting means in or out of the signal line in response to a component of the control signal relating to that switching segment. Switches 221 and 222 are switchable between one position, in which signals are carried between the two along path 231, in which case fiber Bragg grating 211 is not in circuit, and a second position in which signals are carried between the switches along path 232, in which case fiber Bragg grating 211 is in circuit and signals at $\lambda_1$ are reflected by the switching segment (back in whichever direction they arrived from). Each switching segment is similar, but different fiber Bragg gratings (or other appropriate optical components) are provided for each switching segment so that the signals at a chosen set of predetermined carrier wavelengths are reroutable according to the components of the control signal.

The control signal may be provided in any way consistent with, say, provision of an on/off signal at each switching element. With appropriate construction of the switching element, it can then be placed in the first or second position accordingly.

Figure 9B:
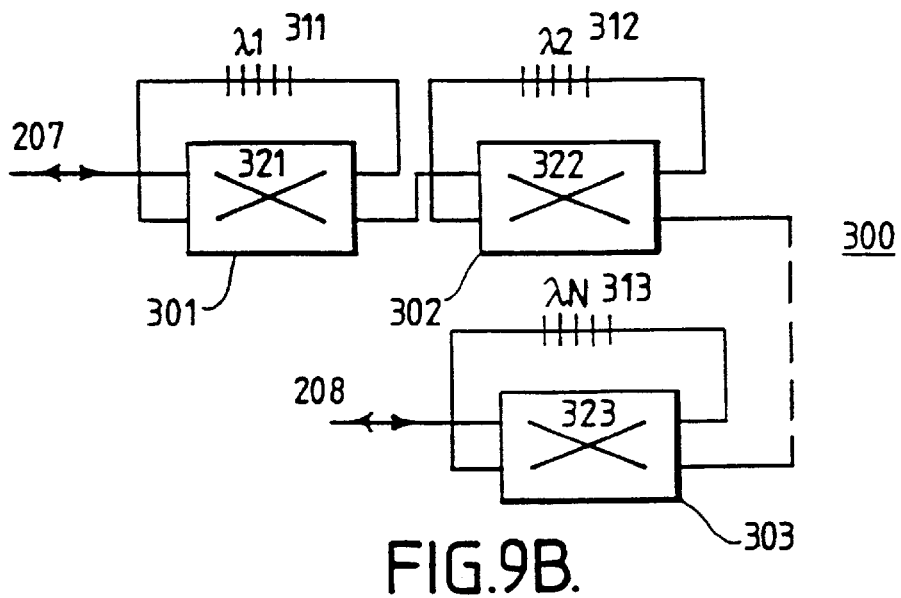

An alternative embodiment which achieves the same functionality is shown in FIG. 9B. Linear array 300 comprises a series of switching elements 301, 302, 303. Each switching element is essentially similar to the switching element shown in FIG. 2A. For example, switching element 301 comprises 2×2 optical switch 321. If switch 321 is in the crossed position, signals pass directly through the switch between input 207 and the input to the next switching element 302. However, if switch 321 is in the straight through position, signals pass around a loop with fiber Bragg grating 311 thereon, so signals on the signal line at $\lambda_1$ are reflected at switching element 301. Again, optical components on the loop of each switching element are chosen so that a chosen set of predetermined carrier wavelengths are rerouted according to the components of the control signal. This arrangement is advantageous in that only one switch is now required per grating.

Figure 9C:
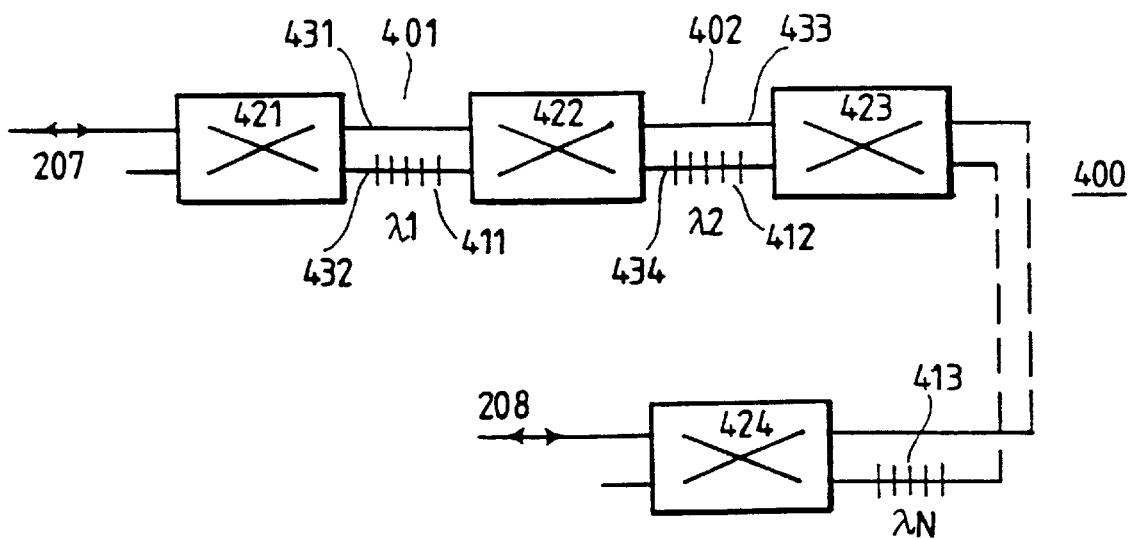

Losses can be reduced by use of a further embodiment of the invention providing the same functionality. This embodiment is illustrated in FIG. 9C, and provides a combination of features from the FIG. 9A and the FIG. 9B embodiments. Linear array 400 comprises N+1 optical switches and N gratings (or other optical components). An exemplary switching element comprises optical switches 421 and 422 (shown as 2×2, though the switches adjacent to input 207 and output 208 may be 1×2) and two paths 431 and 432 therebetween. Fiber Bragg grating 411 is located on path 432, and optical switch 421 is switchable so that either path 431 or path 432 is part of the signal line, with the result that the switching element will not, or will, reflect signals at carrier wavelength $\lambda_1$ respectively. It should be noted that in contrast to the FIG. 9A and FIG. 9B embodiments, the control signal component provided to a given switching element is not independent of the control signal components provided to other switching elements—whether the previous grating was selected or not selected for the signal line determines the switching state required to include the grating of a given switching element in the signal line.

The losses for the three configurations shown in FIGS. 9A to 9C are shown in Table 4 below. Losses of 0.3 dB are assumed for switches and fiber Bragg gratings, whereas losses for splices are neglected.

TABLE 4

|  | 1 × 2 switch BGR Components | Loss (dB) | 2 × 2 switch BGR #1 Components | Loss (dB) | 2 × 2 switch BGR #2 Components | Loss (dB) |
| --- | --- | --- | --- | --- | --- | --- |
| Max. loss | 16 SW - 8 FBG | 7.2 | 16 SW - 8 FBG | 7.2 | 9 SW - 8 FBG | 5.1 |
| Min. loss | 16 SW - 0 FBG | 4.8 | 8 SW - 0 FBG | 2.4 | 9 SW - 0 FBG | 2.7 |
| Delta loss |  | 2.4 |  | 4.8 |  | 2.4 |

The losses indicated in Table 4 above are useful for comparison purposes, but actual device losses will depend on the properties of the components available. It can be seen that the FIG. 9A embodiment has a high static loss, but relatively low differential losses. The FIG. 9B embodiment has a lower minimum loss, but an equally high maximum loss: it thus has a significantly greater differential loss. The FIG. 9C embodiment has a minimum loss only marginally greater than that of the FIG. 9B embodiment (there is one additional switch), but has the same differential loss as the FIG. 9A embodiment. The FIG. 9C embodiment is thus likely to provide the most advantageous practical option, with less than 6 dB total loss and less than 3 dB differential loss for an eight wavelength router.

The arrangements shown in FIGS. 9A to 9C all involve N switching segments, each adapted to be switchable between reflection and transmission of a carrier wavelength $\lambda_N$, thus providing $2^N$ routing options. This form of wavelength routing element is particularly preferred. N control lines, which may for example be provided by sending an N bit binary word, may be provided as the control signal input for the wavelength routing element—the wavelength routing element may thus be considered as a binary grating router, with the status of each switching element (or fiber Bragg grating) defining a binary word. This arrangement can provide a fully variable wavelength routing in very simple fashion with very low losses.

Figure 10:
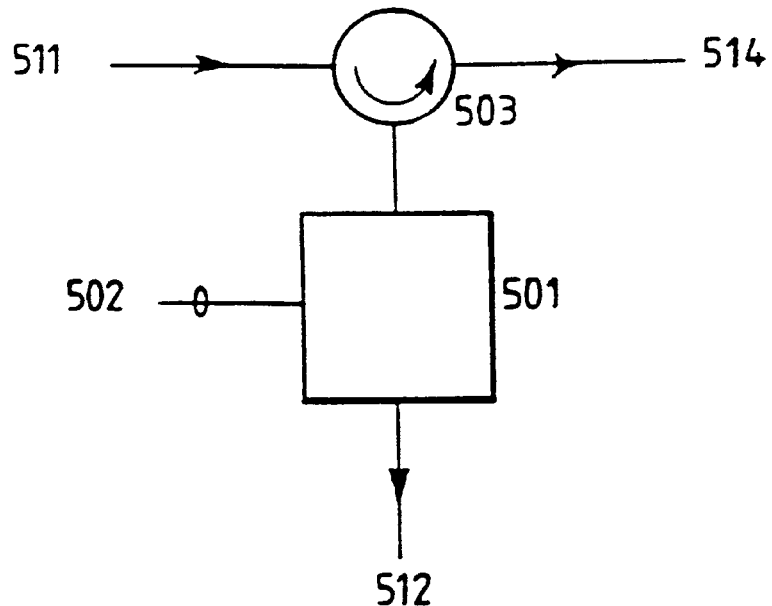
FIG. 10 shows a wavelength separating filter adapted to employ the wavelength routing means of FIG. 9.

Such a wavelength routing element can form the key element of a wavelength separating filter, as is shown in FIG. 10. Binary grating router 501, with control signals 502 input in the form of an N bit word or similar, is provided between a second port of three port circulator 503 and a trunk fiber output 512. Trunk fiber input 511 is connected to the first port of the circulator 503 and drop fiber 514 is connected to the third port of the circulator. Signals at wavelengths $\lambda_N$ for which appropriate fiber Bragg gratings are provided in the signal line are input through trunk fiber input 511, circulated to binary grating router 501, which reflects them, and then further circulated out through drop fiber 514. Signals at wavelengths $\lambda_N$ for which the appropriate fiber Bragg gratings are switched out of the signal line pass straight through the binary grating router 501 and out through the trunk fiber output 512.

Figure 11:
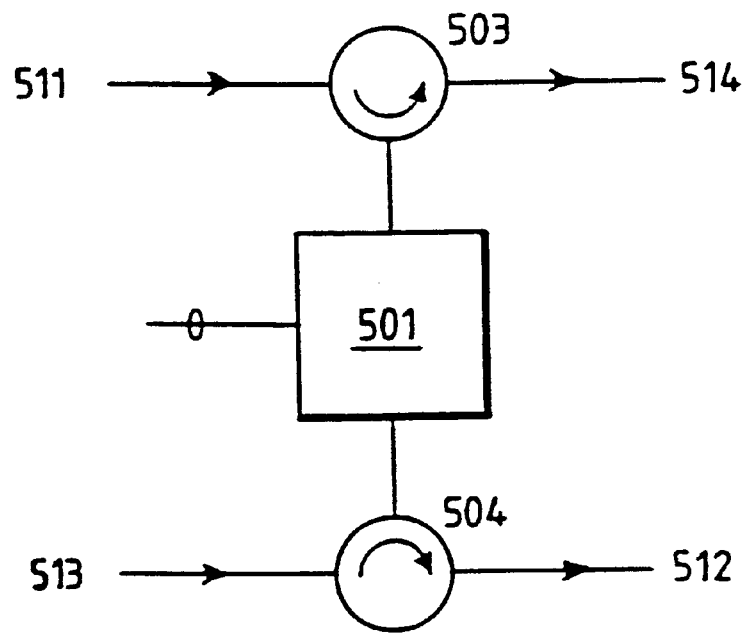
FIG. 11 shows an add/drop multiplexer adapted to employ the wavelength routing means of FIG. 9.

With reference to FIG. 11, addition of a further three port optical circulator 504 leads to an add/drop multiplexer with a binary grating router within it. The add/drop multiplexer provided is that of FIG. 3, with the switching element of FIG. 2A replaced by that of (for example) FIG. 9C. It can be seen that signals at $\lambda_N$ not chosen in the control signal 502 pass directly between try input fiber 511 and trunk output fiber 512, and between add fiber 513 and drop fiber 514. By contrast, signals at $\lambda_N$ selected in the control signal pass either from trunk input fiber 511 to drop fiber 514 or from add fiber 513 to trunk output fiber 512.

This arrangement allows for simple and sophisticated reprogramming of a branching unit to provide, for example, the functionality of FIG. 1B. It is particularly useful in cases where bidirectional traffic to and from a location is required (as is usually the case).

A potential disadvantage is found in the wavelength routing elements of FIGS. 2 and 9, and in add/drop multiplexers constructed therefrom. This disadvantage is that the switching operation will take a finite time, so that traffic on channels to pass straight through a multiplexer will be momentarily interrupted during the switching process as there will be a brief period during which there is no operative signal path. Even if by appropriate component choice one path could be made before the other was broken, it is unlikely that the path lengths would be exactly equal and traffic errors would still result due to path phase differences. This disadvantage applies equally to earlier attempts to provide wavelength routing with switched gratings.

Figure 12:
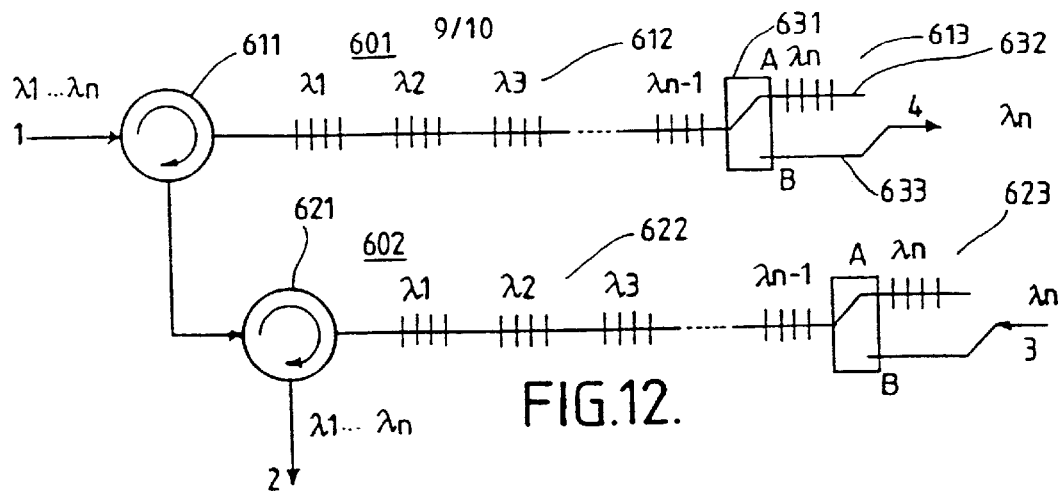
FIG. 12 shows a first embodiment of an add/drop multiplexer comprising wavelength routing means according to a still further aspect of the invention.

An add/drop multiplexer adapted not to have this disadvantage is shown in FIG. 12. The add/drop multiplexer comprises two wavelength routing elements 601 and 602. Each wavelength routing element has an input, an output, and a further connection point which may be used as either an input or an output, depending on the utilisation of the element—this connection point is here termed an input/output.

For wavelength routing element 601, the central element is a three-port optical circulator 611. The input to the element is at the first port of the circulator 611, and the output is provided at the third port. The second port is connected to a signal routing means. The signal routing means comprises a signal reflecting section 612. This consists of a fiber connected to the second port of circulator 611 and having thereon a plurality of fiber Bragg gratings, each adapted to reflect a different carrier wavelength $\lambda_1$ to $\lambda_{n-1}$. The signal routing means also comprises a switchable part 613 by which the signal routing provided by the signal routing means can be altered. The switchable part comprises a switching means 631, here a 1×2 switch, and two alternative signal paths 632 and 633. One signal path terminates in a further fiber Bragg grating reflecting at $\lambda_n$ whereas the other terminates in the input/output of the wavelength routing element. This arrangement allows for selective routing of signals at λn between, in this case, either the input and the output or alternatively the input or output and the input/output: this is similar to the arrangement of FIG. 10, which the wavelength routing element of FIG. 12 resembles in certain aspects. However, in this arrangement, the signal routing means is adapted such that a path for signals for routing from the input to the output irrespective of the state of the switching means is not affected, even temporarily, by any activation of the switching means. In the FIG. 12 case, signals at $\lambda_1$ to $\lambda_{n-1}$ are all intended to pass from the input to the output regardless of the state of the switching means. Any such signal will enter the circulator 611 through the first port, pass out through the second port into the signal reflecting part 612. The signal will then be reflected by the appropriate one of the fiber Bragg gratings, and will return to the second port of the circulator 611. It will then pass out through the third port of the circulator—the output. The signal does not enter a switched part 613 of the signal routing means, and is thus not even temporarily affected by any activation of the switching means 631.

As is shown in FIG. 12, a particularly simple and effective form of add/drop circulator can be constructed from two such wavelength routing elements. Wavelength routing elements 601 and 602 are substantially identical—the only difference is in the use of the input/output. For element 601, the input/output is used as an output: adapted as a drop output 4 to a branch station. For element 602, the input/output is used as an input: an add input 3 from a branch station. The output of element 601 is provided through circulator 611 as the input for element 602. The input of element 601 is adapted for use as a trunk fiber input 1, whereas the output of element 602 is adapted for use as a trunk fiber output 2.

In operation, signals at carrier wavelengths $\lambda_1$ to $\lambda_{n-1}$ enter from the trunk fiber at input 1, and pass through to the second port of circulator 611. They are then all reflected by the appropriate one of the fiber Bragg gratings in the signal reflecting part 612, and pass out of the third port of circulator 611 to the first port of circulator 621 of the second wavelength routing element 602. The signals are reflected at signal reflecting part 622 of the second wavelength routing element 602 and pass out of the third port of circulator 621 to the trunk fiber output. Thus, for the channels which are not involved in switching, the signal path is entirely unaffected as it does not include any switchable parts. This enables all trunk channels which are never to be added or dropped at this multiplexer to have the same optical path through the multiplexer at all times, thus allowing the multiplexer to be reconfigured without risk of trunk channel errors.

For signals at $\lambda_n$, there are two possibilities. In the case shown in FIG. 12, both switches are at position A. In this configuration, signals at this wavelength are reflected by the switchable parts 613, 623 of the signal routing means in the same manner as for the other wavelength channels $\lambda_1$ to $\lambda_{n-1}$, and accordingly pass through from trunk fiber input 1 to trunk fiber output 2. Drop output 4 and add input 3 are not connected in this configuration. The configuration is adapted for a branching unit having the "bypass" routing of FIG. 1C—signals are neither dropped to nor added from a branch station. The normal FIG. 1A case is provided when the two switches are at position B. Now a signal at $\lambda_n$ input from the trunk fiber input I passes straight through signal routing means 612, as it is not reflected by any of the fiber Bragg gratings on the signal path, and is transmitted out through drop output 4. Likewise, a replacement signal at the same wavelength arriving through the add input 3 passes through all the gratings of signal routing means 622 and passes through circulator 621 to trunk fiber output 2. In this configuration, the signal at $\lambda_n$ on the trunk fiber is dropped to a spur station and is replaced by a new signal at the same wavelength.

The skilled man will readily appreciate that different routing choices and combinations of wavelengths can readily be achieved by employing, for example, 1×n switches instead of 1×2 switches, or by having different combinations of gratings on the switch output.

Figure 13:
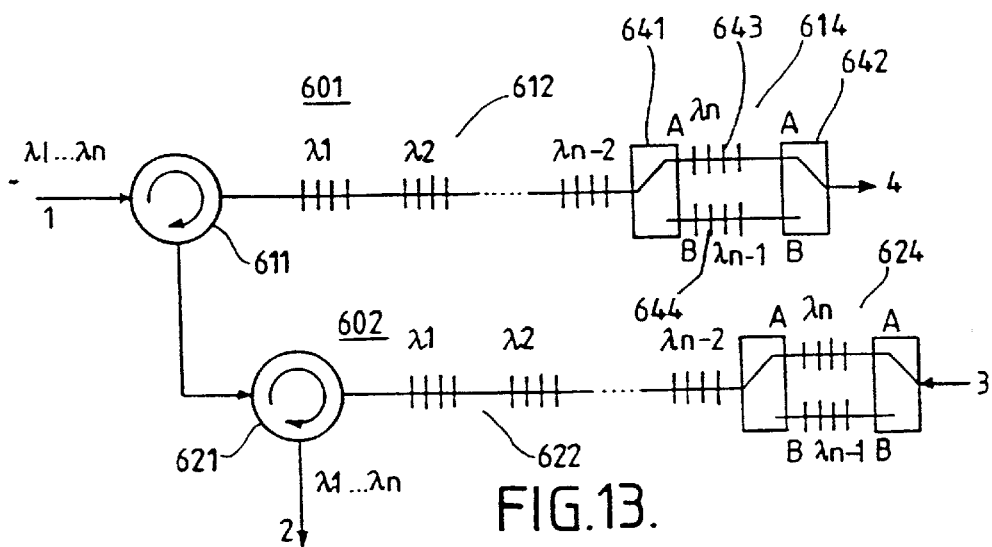
FIG. 13 shows a second embodiment of an add/drop multiplexer comprising wavelength routing means according to said still further aspect of the invention.

Such an alternative possibility is shown in FIG. 13, which illustrates a second embodiment of an add/drop multiplexer employing wavelength routing elements according to this aspect of the invention. Components unchanged from FIG.

12 attract the same reference numbers, though it is to be noted that the fiber Bragg gratings in the signal reflecting parts 612, 622 cover only channels $\lambda_1$ to $\lambda_{n-2}$. The switchable parts 614 and 624 now comprise first and second 1×2 switches 641 and 642, adapted so that either of the alternative signal paths provided links the signal reflecting part 612 or 622 and the input/output of the appropriate wavelength routing element (and hence the add input 3 or the drop output 4 of the multiplexer). The alternative signal paths 643 and 644 each have thereon a fiber Bragg grating, adapted to reflect $\lambda_{n-1}$ and $\lambda_n$ respectively. As can readily be seen, with the switching means in position A, signals at $\lambda_n$ pass from trunk input 1 to trunk output 2 and signals at $\lambda_{n-1}$ are dropped from trunk input 1 to drop output 4 and signals at the same wavelength may be replaced on trunk output 2 from add input 3. In position B, this is reversed—signals at $\lambda_{n-1}$ remain on the trunk fiber whereas signals at $\lambda_n$ are dropped and replaced. The shift of functionality is between the FIG. 1A and the FIG. 1B cases. Again, channels not to be added or dropped in any configuration of the add/drop multiplexer do not reach a switchable part of the multiplexer, and are entirely unaffected by the switching process.

Figure 14:
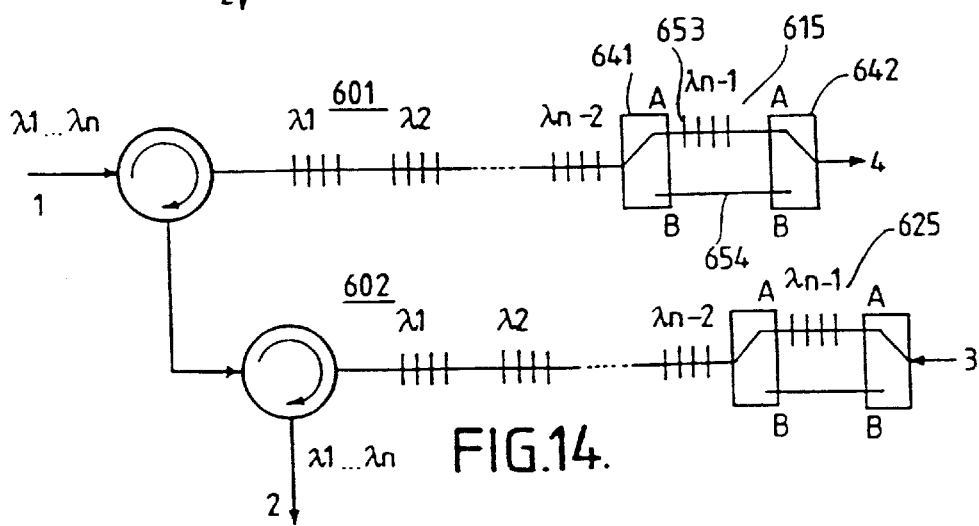
FIG. 14 shows a third embodiment of an add/drop multiplexer comprising wavelength routing means according to said still further aspect of the invention.
Figure 15:
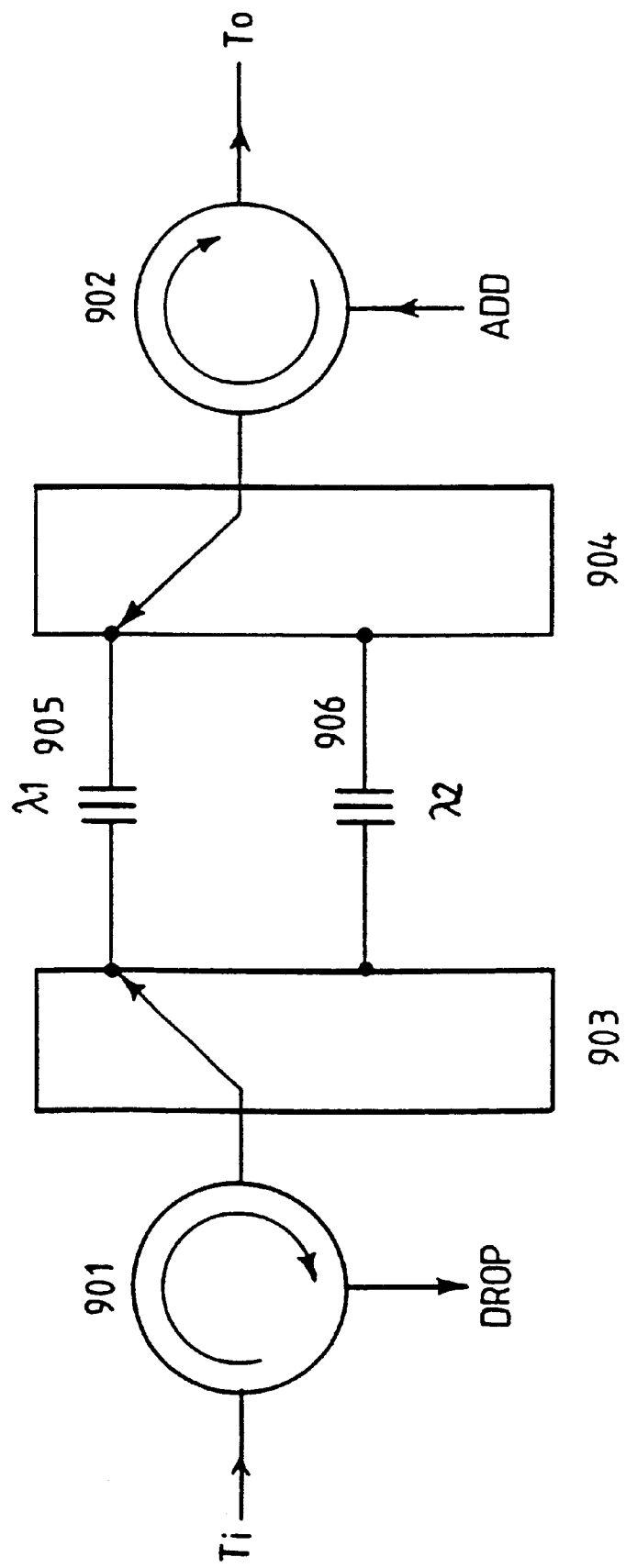
FIG. 15 shows a prior art switchable add/drop multiplexer.

A third embodiment of an add/drop multiplexer employing wavelength routing elements according to this aspect of the invention is shown in FIG. 14. Where components are unchanged, the same reference numerals are used as in FIG. 13. The switchable parts 615 and 616 differ from those shown previously in that the first of the alternative signal paths 653 comprises a fiber Bragg grating reflecting at $\lambda_{n-1}$, whereas the other of the alternative signal paths 654 has no fiber Bragg grating. In this arrangement, signals at $\lambda_n$ are dropped from the trunk to drop output 4 and are replaced from add input 3 in either multiplexer configuration, but signals at $\lambda_{n-1}$ pass straight along the trunk in configuration A when the main signal path includes signal path element 653, and are dropped to and replaced from the spur when the main signal path is in configuration B and hence includes signal path element 654. This arrangement allows for the addition of capacity to a spur station, again without any affect on signals which are not for any configuration to be dropped to and replaced from the spur.

It will be appreciated that alternative forms of switching are entirely consisted with this aspect of the invention—for example, the pair of 1×2 switches in the FIG. 14 embodiment could be replaced by a 2×2 switch arrangement such as that shown in FIG. 2A.

By use of such components employing switched elements within an appropriate passive add/drop multiplexer structure in branching units of a fiber optic system, signals for transmission through a branching unit along the trunk may be left unaffected, even momentarily, by a reconfiguration of the branching unit. Although signals dropped to or received from spur stations may be affected, signals passing the whole way along a fiber optic system from a first to a second terminal station may thus be entirely unaffected by a reconfiguration of the fiber optic system.

What is claimed is:

1. A branching unit for a fiber optic network adapted to carry signals at a plurality of predetermined carrier wavelengths, comprising one or more inputs for receiving signals from one or more trunk fibers of the network and from one or more spur fibers for adding signals from one or more spur stations of the network, one or more outputs for outputting signals to one or more trunk fibers of the network and to one or more spur fibers for dropping signals to spur stations of the network, an add/drop multiplexer for adding signals to and dropping signals from the trunk fibers, and switching means adapted to provide a normal signal routing between designated inputs and designated outputs of the branching unit and to provide an alternative signal routing, such that in said alternative signal routing, no signals are routed to one or more designated outputs of the branching unit, those signals normally routed to said one or more designated outputs being routed to one or more other outputs of the branching unit.

2. A branching unit as claimed in claim 1, wherein said one or more designated outputs are one or more outputs to a spur station of the network.

3. A branching unit as claimed in claim 1, wherein said one or more designated outputs are one or more outputs to trunk fibers in a common section of trunk fibers cable.

4. A branching unit as claimed in claim 1, wherein said switching means comprises means to reflect signals at predetermined carrier wavelengths.

5. A branching unit as claimed in claim 4, wherein said means to reflect signals are fiber Bragg gratings.

6. A branching unit as claimed in claim 4, wherein said switching means comprises one or more switching elements having a first state in which signals pass directly therethrough and a second state in which signals are diverted around a loop path with one or more means to reflect signals at predetermined carrier wavelengths thereon.

7. A branching unit as claimed in claim 6, wherein said means to reflect signals are fiber Bragg gratings.

8. A branching unit as claimed in claim 7, wherein the one or more switching elements are 2×2 optical switches.

9. A branching unit as claimed in claim 8, wherein said 2×2 optical switches each comprise a fused fiber coupler.

10. A branching unit as claimed in claim 9, each said 2×2 optical switch further comprising an electromechanical actuator adapted to strain fibers of the fused fiber coupler from a state in which signals pass directly along said fiber of the fused fiber coupler to a state in which signals pass between the fibers of the fused fiber coupler.

11. A branching unit as claimed in claim 6, wherein the add/drop multiplexer has a first input, a first output, a second input and a second output, adapted such that a first set of carrier wavelengths signals from the first input of the add/drop multiplexer are routed to the first output of the add/drop multiplexer and carrier wavelengths signals from the second input of the add/drop multiplexer are routed to the second output of the add/drop multiplexer, and further adapted such that a second set of carrier wavelengths signals from the first input of the add/drop multiplexer are routed to the second output of the add/drop multiplexer and signals from the second input of the add/drop multiplexer are routed to the first output of the add/drop multiplexer, wherein the switching means comprises a first switching element within the add/drop multiplexer switchable to assign predetermined carrier wavelengths to the first set or the second set of carrier wavelengths signals.

12. A branching unit as claimed in claim 6, wherein for at least one of said switching elements, the add/drop multiplexer is provided within the loop path.

13. A branching unit as claimed in claim 11, wherein said one or more designated outputs are one or more outputs to a spur station of the network.

14. A branching unit as claimed in claim 13, wherein the switching means further comprises a second switching element in which the loop comprises the add/drop multiplexer through the first input and first output thereof, and a third switching element in which the loop comprises the add/drop multiplexer through the second input and second output thereof.

15. A branching unit as claimed in claim 1, wherein said switching means comprises a prerouting switch network connected between inputs and outputs of said add/drop multiplexer and said inputs and outputs of the branching unit to enable rerouting of carrier wavelengths signals away from one or more of the branching unit outputs.

16. A branching unit as claimed in claim 15, wherein said carrier wavelengths signals rerouted away from the one or more of the branching unit outputs do not pass through the add/drop multiplexer.

17. A branching unit as claimed in claim 16, wherein said prerouting switch network comprises a plurality of 2×2 optical switches.

18. A branching unit as claimed in claim 15, wherein the add/drop multiplexer has a first input, a first output, a second input and a second output, adapted such that for a first set of carrier wavelengths signals, signals from the first input of the add/drop multiplexer are routed to the first output of the add/drop multiplexer and signals from the second input of the add/drop multiplexer are routed to the second output of the add/drop multiplexer, and such that for a second set of carrier wavelengths signals, signals from the first input of the add/drop multiplexer are routed to the second output of the add/drop multiplexer and signals from the second input of the add/drop multiplexer are routed to the first output of the add/drop multiplexer.

19. A branching unit as claimed in claim 18, wherein the prerouting switch network comprises first, second and third switching elements, wherein said first switching element has a first input from the second output of the add/drop multiplexer, a second input from a first input to the branching unit, a first output to a second output of the branching unit and a second output to a first input of the third switching element, and wherein the second switching element has a first input from the first output of the add/drop multiplexer, a second input from a second input of the branching unit, a first output to a second input of the third branching unit and a second output to a second input of the add/drop multiplexer, and wherein the third switching element has a first output to a first input of the add/drop multiplexer and a second output to a first output of the branching unit, wherein each of said switching elements is switchable between a first state in which signals from the first input to the branching unit pass to the first output of the branching unit and signals from the second input to the branching unit pass to the second output of the branching unit, and a second state in which signals from the first input to the branching unit pass to the second output of the branching unit and signals from the second input to the branching unit pass to the second output of the branching unit.

20. A branching unit as claimed in claim 19, wherein n is 4.

21. A branching unit as claimed in claim 20, wherein the add/drop multiplexer has a first input, a first output, and an input/output spur, adapted such that for a first set of carrier wavelengths signals, signals from the first input of the add/drop multiplexer are routed to the first output of the add/drop multiplexer, and such that for a second set of carrier wavelengths signals, signals from the first input of the add/drop multiplexer are routed to the input/output spur of the add/drop multiplexer and signals from the input/output spur of the add/drop multiplexer are routed to the first output of the add/drop multiplexer, and wherein the prerouting switch network comprises a single 4×4 switch, having a first left side connection to a first input of the branching unit, a second left side connection to a first output of the branching unit, a third left side connection to an input/output spur of the branching unit, a fourth left side connection to the input/output spur of the add/drop multiplexer, a first right side connection to the first input of the add/drop multiplexer, a second right side connection to the first output of the add/drop multiplexer, and a third right side connection and a fourth right side connection connected to each other, said four left side connections forming a first sequence of first, second, third, fourth left side connections and said four right side connections forming a second sequence of first, second, third and fourth right side connections, wherein said 4×4 switch has four positions, and for each position said first left side connection is in communication with a selected one of said four right side connections, and wherein the remaining left side connections are each communicated with the right side connection having the relationship in the second sequence to the selected one of the right side connections that said each remaining one of the left side connections has to the first left side connection.

22. A branching unit as claimed in claim 18, wherein said 2×2 optical switches each comprise a fused fiber coupler.

23. A branching unit as claimed in claim 15, wherein the add/drop multiplexer has a first input, a first output, and an input/output spur, adapted such that for a first set of carrier wavelengths signals, signals from the first input of the add/drop multiplexer are routed to the first output of the add/drop multiplexer, and such that for a second set of carrier wavelengths signals, signals from the first input of the add/drop multiplexer are routed to the input/output spur of the add/drop multiplexer and signals from the input/output spur of the add/drop multiplexer are routed to the first output of the add/drop multiplexer.

24. A branching unit as claimed in claim 23, wherein the prerouting switch network comprises first, second and third switching elements, wherein said first switching element has a first left-side connection to a first output of the branching unit, a second left-side connection to the first input to the add/drop multiplexer, a first right-side connection to a first left-side connection to the third switching element and a second right-side connection to a first right-side connection of the second switching element, and wherein the second switching element has a first left-side connection to a first input of the branching unit, a second left-side connection to the input/output spur of the add/drop multiplexer, and a second right-side connection to a second left-side connection of the third switching element, and wherein the third switching element has a first right-side connection to the first output of the add/drop multiplexer and a second right-side connection to an input/output spur of the branching unit, wherein each of said switching elements is switchable between a first state in which signals pass between its first left-side connection and its first right-side connection and signals pass between its second left-side connection and its second right-side connection, and a second state in which signals pass between its first left-side connection and its second right-side connection and between its second left-side connection and its first right-side connection.

25. A branching unit as claimed in claim 15, wherein the add/drop multiplexer has a plurality of trunk fiber inputs, a plurality of trunk fiber outputs, there being defined for each trunk fiber an input/output pair comprising one of said plurality of trunk fiber inputs and one of said plurality of trunk fiber outputs, and a spur input to the add/drop multiplexer and a spur output from the add/drop multiplexer, the add/drop multiplexer being adapted such that signals are routed according to carrier wavelength from each said trunk fiber input to either the trunk fiber output of the input/output pair or the spur output of the add/drop multiplexer, and from the spur input of the add/drop multiplexer to determined ones of the plurality of trunk fiber outputs.

26. A branching unit as claimed in claim 25, wherein said carrier wavelength signals rerouted away from the one or more of the branching unit outputs do not pass through the add/drop multiplexer.

27. A branching unit as claimed in claim 25, wherein said prerouting network comprises for each one of said trunk fibers first, second, and third switching elements, wherein said first switching element has a first left side connection to a line receiving signals from a spur input of the branching unit, a second left side connection to a first left side connection of the second switching element, a first right side connection to a line for providing signals to the spur input of the add/drop multiplexer, and a second right side connection to a trunk fiber output of the branching unit for said one of the trunk fibers, wherein the second switching element has a second left side connection to a first left side connection of the third switching element, a first right side connection to the trunk fiber output of the add/drop multiplexer for said one of the trunk fibers, and a second right side connection to a trunk fiber input of the branching unit for said one of the trunk fibers, and wherein the third switching element has a second left side connection to a line receiving signals from the spur output of the add/drop multiplexer, a first right side connection to the fiber input of the add/drop multiplexer for said one of the trunk fibers, and a second right side connection to a line for providing signals for a spur output of the branching unit for said one of the trunk fibers, wherein each of said switching elements is switchable between a first state in which signals pass between its first left-side connection and its first right-side connection and signals pass between its second left-side connection and its second right-side connection, and a second state in which signals pass between its first left-side connection and its second right-side connection and between its second left-side connection and its first right-side connection.

28. A branching unit as claimed in claim 15, each said 2×2 optical switch further comprising an electromechanical actuator adapted to strain fibers of the fused fiber coupler from a state in which signals pass directly along said fibers of the fused fiber coupler to a state in which signals pass between the fibers of the fused fiber coupler.

29. A branching unit as claimed in claim 15, wherein said prerouting switch network comprises a plurality of 1×2 optical switches.

30. A branching unit as claimed in claim 15, wherein said prerouting switch network comprises one or more n×n switches, where n is an integer greater than two.

31. A branching unit as claimed in claim 1, wherein said add/drop multiplexer consists of passive optical components.

* * * * *